(12) United States Patent
Jung et al.

(10) Patent No.: US 11,455,139 B2
(45) Date of Patent: Sep. 27, 2022

(54) ELECTRONIC DEVICE AND METHOD FOR INDEPENDENTLY CONTROLLING A PLURALITY OF DISPLAYS

(71) Applicant: Samsung Electronics Co., Ltd., Gyeonggi-do (KR)

(72) Inventors: Byoungho Jung, Gyeonggi-do (KR); Chihyun Cho, Gyeonggi-do (KR); Hyewon Koo, Gyeonggi-do (KR); Yongjin Kwon, Gyeonggi-do (KR); Byungseok Jung, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 17/374,038

(22) Filed: Jul. 13, 2021

(65) Prior Publication Data

US 2021/0342110 A1 Nov. 4, 2021

Related U.S. Application Data

(63) Continuation of application No. 16/508,430, filed on Jul. 11, 2019, now Pat. No. 11,093,199.

(30) Foreign Application Priority Data

Jul. 30, 2018 (KR) .......................... 10-2018-0088773

(51) Int. Cl.
*G06F 3/14* (2006.01)
*G06F 3/04847* (2022.01)
*G06F 3/0487* (2013.01)

(52) U.S. Cl.
CPC ........ *G06F 3/1423* (2013.01); *G06F 3/04847* (2013.01)

(58) Field of Classification Search
CPC .......................... G06F 3/1423; G06F 3/04847
See application file for complete search history.

(56) References Cited

U.S. PATENT DOCUMENTS

2002/0030635 A1 3/2002 McGowan
2011/0153881 A1 6/2011 Ace
(Continued)

FOREIGN PATENT DOCUMENTS

EP         2 555 515 A1    2/2013
KR   10-2015-0121556 A   10/2015
WO      2008/081978 A1    7/2008

OTHER PUBLICATIONS

Hildebrand; "Android 101: Manage your battery life by setting your screen timeout and brightness"; Sep. 12, 2011; https://www.androidcentral.com/android-101-manage-your-battery-life-setting-your-screen-timeout-and-brightness.

*Primary Examiner* — Mark Edwards
*Assistant Examiner* — Chayce R Bibbee
(74) *Attorney, Agent, or Firm* — Cha & Reiter, LLC

(57) ABSTRACT

An electronic device and method are disclosed herein. The electronic device includes a display, a wireless communication circuit, and electrical connector and a processor. The processor implements the method, including: detecting whether the electronic device is communicatively connected to an external display device through a wireless communication circuit or an electrical connector, when the electronic device is communicatively disconnected from the external display device, displaying, on the display, a first user interface for configuring a first screen timeout time associated with the display, when the electronic device is communicatively connected to the external display device, displaying a first screen on the display, and displaying a second screen on the external display device, the second screen different from the first screen, and displaying, on the external display
(Continued)

device, a second user interface for configuring a second screen timeout time related to the external display device.

16 Claims, 17 Drawing Sheets

(56) References Cited

U.S. PATENT DOCUMENTS

| | | |
|---|---|---|
| 2012/0137217 A1 | 5/2012 | Amsterdam et al. |
| 2013/0027314 A1 | 1/2013 | Masaki et al. |
| 2014/0095914 A1 | 4/2014 | Andou et al. |
| 2014/0123156 A1 | 5/2014 | Schillings et al. |
| 2014/0285498 A1* | 9/2014 | Kim ................. G06F 1/1643 |
| | | 345/501 |
| 2014/0313414 A1* | 10/2014 | Wu ................. H04N 21/4621 |
| | | 348/552 |
| 2015/0253838 A1 | 9/2015 | Amsterdam et al. |
| 2015/0302823 A1* | 10/2015 | Lee ..................... G06F 3/14 |
| | | 345/2.1 |
| 2016/0148557 A1* | 5/2016 | Hori ................. G09G 3/2096 |
| | | 345/212 |
| 2016/0327298 A1 | 11/2016 | Sinha et al. |
| 2017/0142091 A1 | 5/2017 | Godfrey et al. |

* cited by examiner

ELECTRONIC DEVICE AND METHOD FOR INDEPENDENTLY CONTROLLING A PLURALITY OF DISPLAYS

CROSS-REFERENCE TO RELATED APPLICATION(S)

This application is a Continuation of Ser. No. 16/508,430 filed on Jul. 11, 2019 which is based on and claims priority under 35 U.S.C. 119 to Korean Patent Application No. 10-2018-0088773, filed on Jul. 30, 2018, in the Korean Intellectual Property Office, the disclosures of which are herein incorporated by reference in their entireties.

TECHNICAL FIELD

The disclosure relates to an electronic device and method for independently controlling a plurality of displays.

BACKGROUND

As electronic devices and portable devices have grown in popularity, an increasing variety of functions are provided in such electronic devices.

In order to support multimedia-related functions such as image editing and video playback, electronic devices include a display capable of outputting display screens. The electronic device (e.g., a smart phone) including a display may further operatively communicate with an external display of an external electronic device (e.g., a tablet PC, a desk top, or a wearable device) to enable further functionality and convenience for a user.

When the electronic device is operatively coupled with the local display and the external display, these displays are collectively managed by the electronic device. Unfortunately, this may increase power consumption of a battery in the electronic device.

SUMMARY

The disclosure provides an electronic device and method for independently controlling power of a plurality of displays by setting a first screen timeout time related to a display of the electronic device, and separately setting a second screen timeout time related to a display of an external electronic device connected to the electronic device. This reduces the battery consumption of the electronic device.

According to certain embodiments of the disclosure, an electronic device may include a display; a wireless communication circuit; an electrical connector; a processor functionally connected to the display, the wireless communication circuit, and the electrical connector; and a memory functionally connected to the processor. The memory may store instructions that cause, when executed, the processor to: detect whether the electronic device is communicatively connected to an external display device through the wireless communication circuit or the electrical connector, when the electronic device is communicatively disconnected from external display device, display, on the display, a first user interface for configuring a first screen timeout time associated with the display, when the electronic device is communicatively connected to the external display device: display a first screen on the display, display a second screen on the external display device, the second screen different from the first screen, and display, on the external display device, a second user interface for configuring a second screen timeout time related to the external display device.

According to certain embodiments of the disclosure, a method for independently controlling power of a display of an electronic device and power of an external display device may include: detecting whether the electronic device is communicatively connected to an external display device through a wireless communication circuit or an electrical connector, when the electronic device is communicatively disconnected from the external display device, displaying, on the display, a first user interface for configuring a first screen timeout time associated with the display, when the electronic device is communicatively connected to the external display device, displaying a first screen on the display, and displaying a second screen on the external display device, the second screen different from the first screen, and displaying, on the external display device, a second user interface for configuring a second screen timeout time related to the external display device.

DETAILED DESCRIPTION

Figure 1:
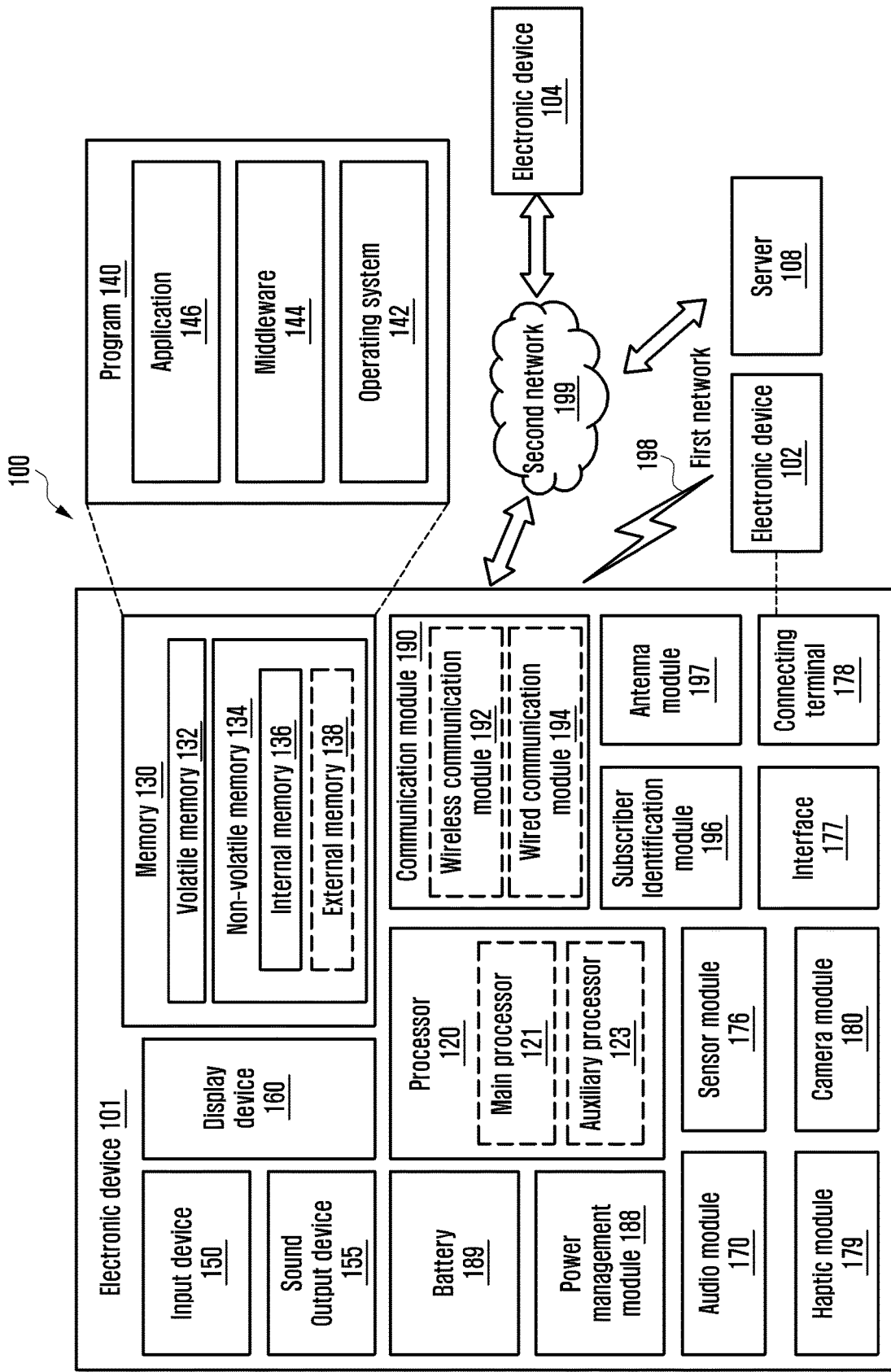
FIG. 1 is a block diagram illustrating an electronic device in a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store certain data used by at least one component (e.g., the processor 120 or the sensor module 176) of the electronic device 101. The certain data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit/receive a signal or power to/from an external entity (e.g., an external electronic device). According to some embodiments, the antenna module 197 may be formed of a conductor or a conductive pattern and may further include any other component (e.g., RFIC). According to an embodiment, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
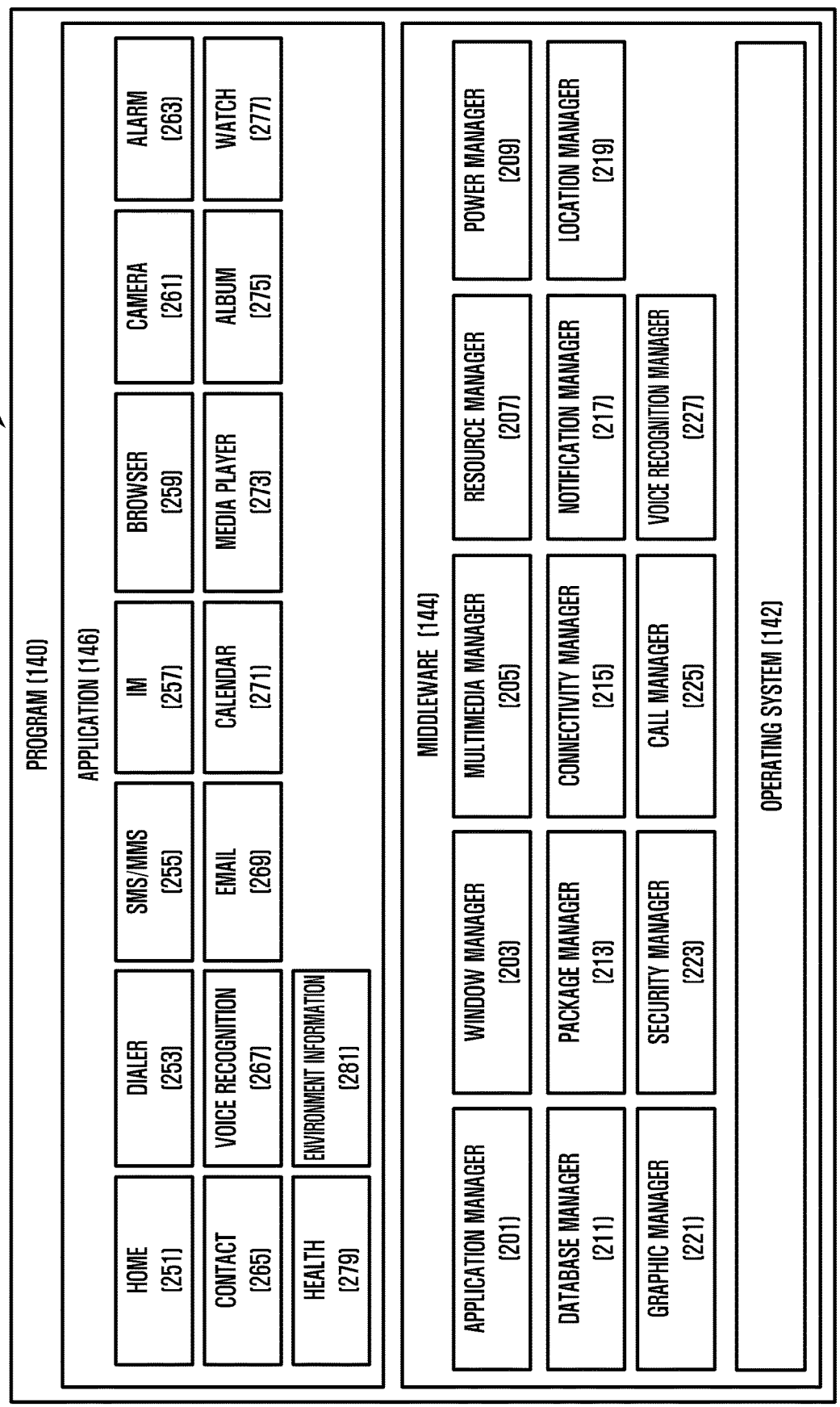
FIG. 2 is a block diagram illustrating a program of an electronic device according to certain embodiments.

FIG. 2 is a block diagram illustrating a program of an electronic device according to certain embodiments.

According to an embodiment, the program 140 is capable of including an operation system (OS) 142 and middleware 144 for controlling at least one resources related to the electronic device (e.g., electronic device 101) and/or certain applications running on the OS. The OS 142 may be Android, iOS, Windows, Symbian, Tizen, Bada, etc. At least part of the program 140 may be preloaded on the electronic device (e.g., electronic device 101) or downloaded from a server (e.g., an electronic device 102 or 104, server 106).

The operation system 142 may control the management (e.g., allocation or retrieval) of one or more system resources (e.g., process, memory, or power) of the electronic device 101. The operation system 142 may include one or more driver programs for driving other hardware devices of the electronic device 101 such as the input device 150, the sound output device 155, the display device 160, the audio module 170, the sensor module 176, the interface 177, the haptic module 179, the camera module 180, the power management module 188, the battery 189, the communication module 190, the subscriber identifier module 196, and the antenna module 197.

The middleware 144 may provide a function required in common by the applications 146. Further, the middleware 144 may provide a function through the API to allow the applications 146 to efficiently use limited system resources within the electronic device 101. According to an embodiment, the middleware 144 may include an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a call manager 225, and a voice recognition manager 227.

The application manager 201 may manage, for example, a life cycle of at least one of the applications 146. The window manager 203 may manage GUI resources used on the screen. The multimedia manager 205 may detect a format required for reproducing certain media files and perform an encoding or a decoding of a media file by using a codec suitable for the corresponding format. The resource manager 207 manages resources such as a source code, a memory 130, or a storage space of at least one of the applications 146. The power manager 209 may operate together with a basic input/output system (BIOS) to manage a battery 189 or power and provides power information required for the operation.

The database manager 211 may manage generation, search, and change of a database to be used by at least one of the applications 146. The package manager 213 may manage an installation or an update of an application distributed in a form of a package file. The connectivity manager 215 may manage, for example, a wireless connection such as Wi-Fi or Bluetooth. The notification manager 217 may display or notify a user of an event such as an arrival message, an appointment, a proximity alarm or the like, in a manner that does not disturb the user. The location manager 219 may manage location information of the electronic device. The graphic manager 221 may manage a graphic effect provided to the user or a user interface related to the graphic effect.

The security manager 223 provides a general security function required for a system security or a user authentication. According to an embodiment, when the electronic device (for example, the electronic device 101) has a call function, the middleware 144 may further include a telephony manager for managing a voice of the electronic device or a video call function. The middleware 144 is capable of including modules configuring certain combinations of functions of the above described components. The middleware 144 is capable of providing modules specialized according to types of operation systems to provide distinct functions. The middleware 144 may be adaptively configured in such a way as to remove part of the existing components or to include new components.

The applications 146 may include one or more applications for performing certain functions, e.g., home 251, dialer 253, short message service (SMS)/multi-media message service (MMS) 255, instant message (IM) 257, browser 259, camera 261, alarm 263, contact 265, voice recognition 267, email 269, calendar 271, media player 273, album 275, watch 277, health 279, and environment information 281. Furthermore, although not shown, the applications 146 may also include health care (e.g., an application for measuring amount of exercise, blood sugar level, etc.), and environment information (e.g., an application for providing atmospheric pressure, humidity, temperature, etc.).

According to an embodiment, the applications 146 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

According to an embodiment, the applications 146 are capable of including an application (e.g., a health care application of a mobile medical device, etc.) having specified attributes of an external device (e.g., electronic devices 102 and 104). According to an embodiment, the applications 146 are capable of including applications received from an external device (e.g., a server 106, electronic devices 102 and 104). According to an embodiment, the applications 146 are capable of including a preloaded application or third party applications that can be downloaded from a server. It should be understood that the components of the program 140 may be called different names according to types of operating systems.

The electronic device according to certain embodiments may be one of certain types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
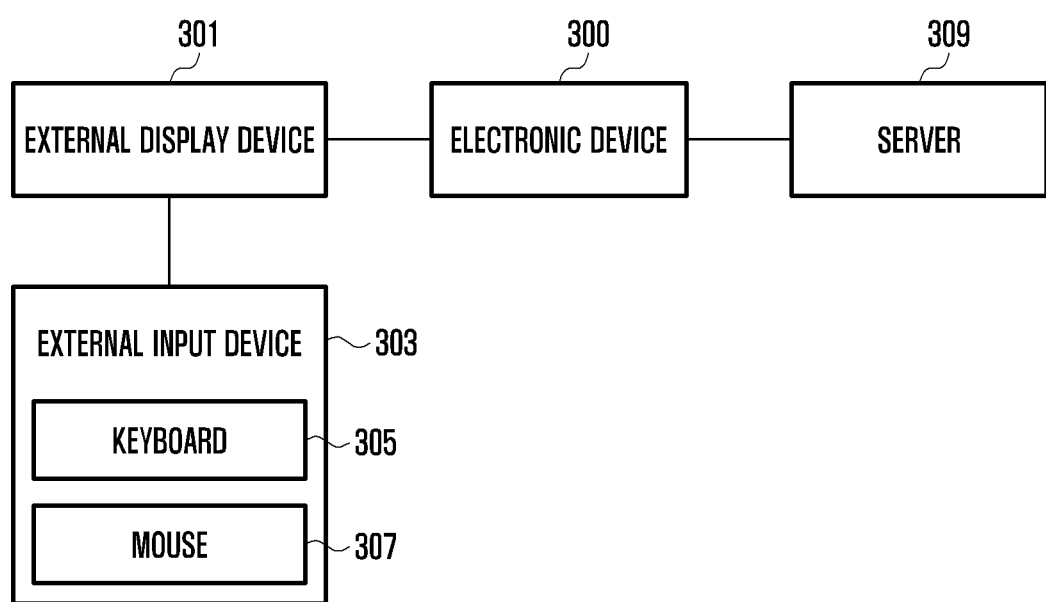
FIG. 3 is a block diagram illustrating a connection relationship among an electronic device and external devices according to certain embodiments.

FIG. 3 is a block diagram illustrating a connection relationship among an electronic device and external devices according to certain embodiments.

Referring to FIG. 3, the electronic device 300 (e.g., the electronic device 101 in FIG. 1) according to certain embodiments may be connected wiredly or wirelessly to an external display device 301 (e.g., the display device 160 in FIG. 1) and a server 309 (e.g., the server 108 in FIG. 1).

According to certain embodiments, the electronic device 300 may be coupled (e.g., connected) to the external display device 301 via an interface (e.g., the interface 177 in FIG. 1) or a connecting terminal (e.g., the connecting terminal 178 in FIG. 1). Using the external display device 301, the electronic device 300 may provide a variety of user interfaces (UIs) to the user of the electronic device 300.

According to an embodiment, the electronic device 300 may include at least one of a smart phone, a tablet PC, a wearable device, or a desktop. The external display device 301 may include a display device such as a monitor or a TV. The interface may include a high definition multimedia interface (HDMI), a universal serial bus (USB) interface, an SD card interface, or an audio interface. The connecting terminal may include an HDMI connector, a USB connector, an SD card connector, or an audio connector (e.g., a headphone connector).

According to certain embodiments, when connected to the electronic device 300, the external display device 301 may display a screen processed by the electronic device 300. Specifically, when wiredly or wirelessly connected to the electronic device 300, the external display device 301 may display a second UI for receiving a second input of setting a second screen timeout time related to the external display device 301 from the user of the electronic device 300.

According to an embodiment, the external display device 301 may be connected to an external input device 303 (e.g., the input device 150 in FIG. 1) in a wired or wireless manner. The external input device 303 may include certain devices capable of receiving a user's input, such as a keyboard 305 or a mouse 307. The external input device 303 may be also connected to the electronic device 300 in a wired or wireless manner. When connected to the external display device 301, the electronic device 300 may perform a response corresponding to an input into the external input device 303.

According to certain embodiments, the server 309 may communicate wirelessly with the electronic device 300 by using a communication module (e.g., the communication module 190 in FIG. 1). The server 309 may store a list (i.e., a white list) of applications that support resizing of a window. The server 309 may also store a list (i.e., black list) of applications that cannot be executed when the electronic device 300 is connected to the external display device 301. Such lists stored in the server 309 may be periodically updated. The server 309 may transmit such lists to the electronic device 300.

Figure 4:
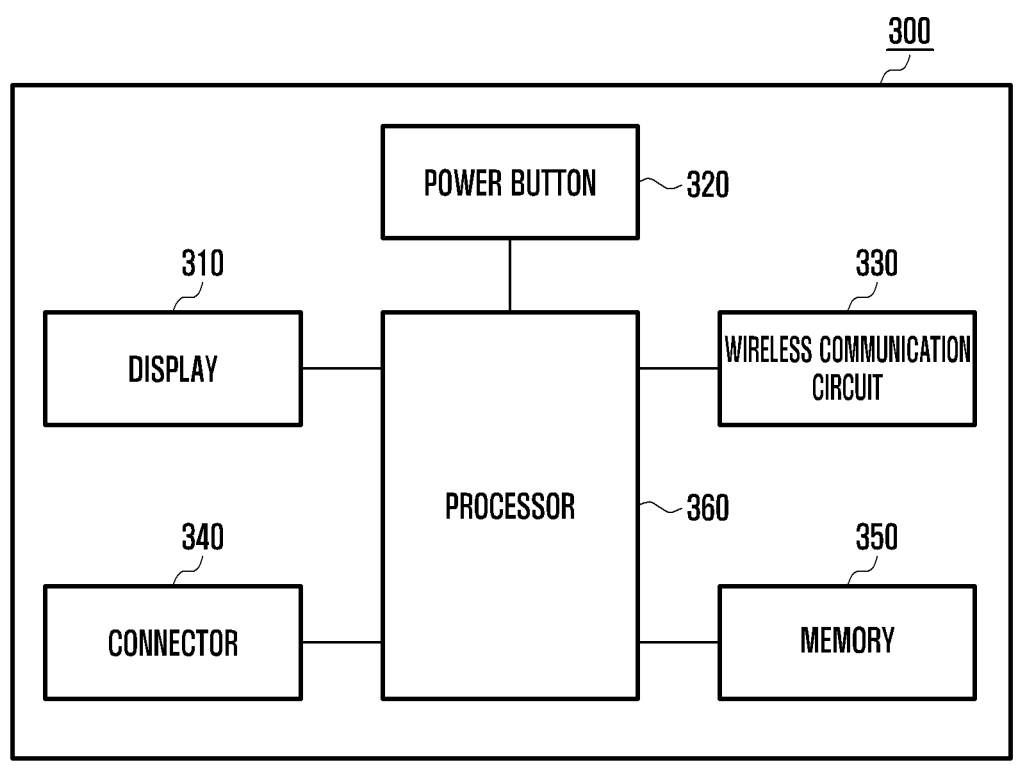
FIG. 4 is a block diagram schematically illustrating the configuration of an electronic device according to certain embodiments.

FIG. 4 is a block diagram schematically illustrating the configuration of an electronic device according to certain embodiments.

Referring to FIG. 4, the electronic device 300 according to certain embodiments may include a display 310, a power button 320, a wireless communication circuit 330, a connector 340, a memory 350, and a processor 360.

According to an embodiment, the electronic device 300 may include, for example, at least a part of the electronic device 101, 102, or 104 in FIG. 1. The display 310 may include, for example, display device 160 in FIG. 1. The wireless communication circuit 330 may include, for example, the communication module 190 in FIG. 1. The connector 340 may include, for example, the interface 177 or the connecting terminal 178 in FIG. 1. The memory 350 may include, for example, the memory 130 in FIG. 1. The processor 360 may include, for example, the processor 120 of FIG. 1.

According to certain embodiments, the display 310 may display a first UI for receiving a first input of setting a first screen timeout time related to the display 310 from a user of the electronic device 300.

According to an embodiment, the display 310 may perform both an input function for detecting a touch input and a display function for outputting a screen. The display 310 may include a touch panel and a display panel. For example, the display 310 may be formed of a liquid crystal display (LCD), an organic light emitting diode (OLED), an active matrix OLED (AMOLED), a flexible display, a transparent display, or the like. The display 310 may visually offer a menu of the electronic device 300, input data, function setting information, and certain kinds of other information to the user.

According to certain embodiments, the power button 320 may turn on or off functions of the electronic device 300. According to an embodiment, the power button 320 may be formed of a physical key or a soft key.

According to certain embodiments, the wireless communication circuit 330 may communicate with the server 309 shown in FIG. 3. The wireless communication circuit 330 may receive information from the server 309.

According to an embodiment, the wireless communication circuit 330 may support wired and/or wireless communication function(s) of the electronic device 300. For example, the wireless communication circuit 330 may include a mobile communication module that supports a mobile communication (e.g., based on 2G 3G 4G and/or 5G standard) function, and/or a wireless LAN communication module, a Wi-Fi communication module, a Bluetooth communication module, an infrared communication module, and a Zigbee communication module that support a short-range communication function. In addition, the wireless communication circuit 330 may include certain communication modules such as an HDMI communication module and a USB communication module that support a wired communication function.

According to certain embodiments, the connector 340 may connect the electronic device 300 and the external display device 301 shown in FIG. 3. According to an embodiment, the connector 340 may include at least one of a USB connector, an HDMI connector, an SD card connector, or an audio connector. In addition, the connector 340 may include at least one of a USB, an HDMI, or an optical interface. Also, the connector 340 may include certain communication interfaces for wirelessly connecting the electronic device 300 and the external display device 301.

According to certain embodiments, the memory 350 may store instructions that cause the display 310 to display a first UI for receiving a first input of setting a first screen timeout time related to the display 310 of the electronic device 300 when a first operation is executed in case of no connection made between the electronic device 300 and the external display device 301.

According to certain embodiments, the memory 350 may store instructions that cause the display 310 to display a first screen and also cause the external display device 301 to display a second screen different from the first screen when a second operation is executed in case of wired or wireless connection made between the electronic device 300 and the external display device 301 via the connector 340 or the wireless communication circuit 330.

According to certain embodiments, the memory 350 may store instructions that cause the external display device 301 to display a second UI for receiving a second input of setting a second screen timeout time related to the external display device 301 when the second operation is executed.

According to certain embodiments, the memory 350 may store instructions that cause the display 310 to display the first UI when the second operation is executed. The memory 350 may store instructions that cause the display 310 to display the second UI when the second operation is executed.

According to an embodiment, the memory 350 may store a program for processing and controlling the processor 360, an operating system (OS), input/output data, and any other program for controlling operations of the electronic device 300. The memory 350 may store at least one user interface (UI) provided in the electronic device 300 and certain types of setting information utilized for processing functions related to certain embodiments in the electronic device 300. Such setting information and programs stored in the memory 350 will be described in detail with reference to FIG. 5.

According to certain embodiments, the processor 360 may be operatively connected to the display 310, the power button 320, the wireless communication circuit 330, the connector 340, and the memory 350, thus controlling the functions and operations of such components. The processor 360 may perform instructions stored in the memory 350.

According to an embodiment, the processor 360 may be configured to separately manage the final user input time for the display 310 of the electronic device 300 and the final user input time for the external display device 301. A final user input time may indicate a time from which some activity may be undertaken (e.g., deactivating a display) if a user input is not received within a set period of time referred to as the final user input time. In particular, the processor 360 may be configured to perform power saving for the display 310 and also allow the external display device 301 to be continuously used, when the first screen timeout time set for the display 310 elapses from the final user input time for the display 310 of the electronic device 300. The power saving for the display 310 may include at least one of power off of the display 310, power off of an input device (e.g., the input device 150 in FIG. 1) such as a touch panel or a stylus pen related to the display 310, and pausing of an application that is running on the display 310. In addition, the processor 360 may be configured to turn off the power of both the display 310 and the external display device 301 and also operate the electronic device 300 in a sleep mode, when the first screen timeout time set for the display 310 elapses from the final user input time for the display 310 and further when the second screen timeout time set for the external display device 301 elapses from the final user input time for the external display device 301.

According to an embodiment, in addition to turning off the power of both the display 310 and the external display device 301 in response to the elapse of both the first and second screen timeout times, the processor 360 may be configured to turn off the power of the display 310 in response to a particular user input. For example, the processor 360 may be configured to power off the display 310 in response to an input such as pressing the power button 320 or closing a cover equipped in the electronic device 300. The first screen timeout time and the second screen timeout time may be individually set by the user of the electronic device 300 or differently and temporarily set according to the attributes of windows displayed respectively on the display 310 and the external display device 301.

According to an embodiment, the processor 360 may perform functions of controlling the overall operations of the electronic device 300, controlling a signal flow between components of the electronic device 300, and processing data. The processor 360 may include, for example, a central processing unit (CPU), an application processor (AP), a communication processor (CP), and/or the like. The processor 360 may be formed of a single core processor or a multi-core processor, and may be implemented by a plurality of processors.

Figure 5:
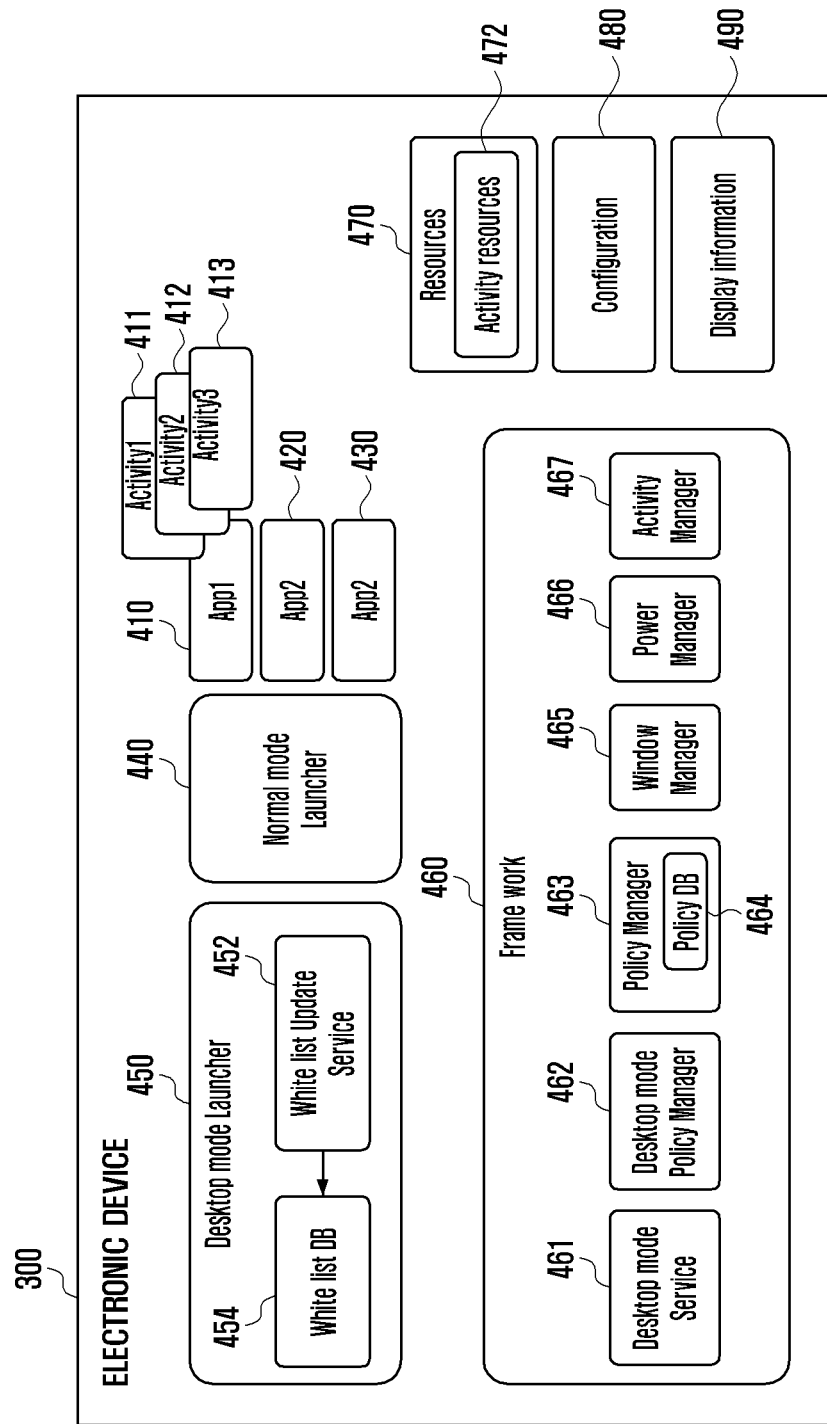
FIG. 5 is a block diagram illustrating a program module included in an electronic device according to certain embodiments.

FIG. 5 is a block diagram illustrating a program module included in an electronic device according to certain embodiments.

Referring to FIG. 5, the electronic device 300 according to certain embodiments may store at least one of a first application (App1) 410, a second application (App2) 420, a third application (App3) 430, a normal mode launcher 440, a desktop mode launcher 450, a framework 460, resources 470, a configuration 480, and display information 490.

According to an embodiment, the program modules shown in FIG. 5 may be stored in the memory 350 of the electronic device 300 and executed by the processor 360. The program modules may further include at least some of the programs 140 shown in FIG. 2.

According to certain embodiments, the first application 410, the second application 420, and the third application 430 may be stored in the memory 350 of the electronic device 300. Not limited to the first application 410 to the third application 430, the electronic device 300 may further store a certain number of applications in the memory 350. The first application 410 to the third application 430 may each include a plurality of activities. For example, the first application 410 may be implemented by a first activity (Activity1) 411, a second activity (Activity2) 412, and a third activity (Activity3) 413. Each of the first activity 411 to the third activity 413 may utilize a screen in the horizontal direction (i.e., landscape mode), a screen in the vertical direction (i.e., portrait mode), or both screens in the horizontal and vertical directions.

According to an embodiment, each of the first application 410 to the third application 430 may include certain types of software executed in the electronic device 300 and used by the user. For example, each of the first application 410 to the third application 430 may include at least one of a word processor, a spreadsheet, a social network system (SNS), a chatting, a map, a music player, and a video player. According to certain embodiments, all kinds of software that can be designed using an input device (e.g., the input device 150 in FIG. 1) or a display (e.g., the display 310 in FIG. 3) by the user may be used as the applications.

According to certain embodiments, the normal mode launcher 440 may be executed when the electronic device 300 is not connected to the external display device 301. The normal mode launcher 440 may provide a user interface (UI), such as a home screen, displayed on the display 310. According to an embodiment, the normal mode launcher 440 may be configured to display, on the display 310, a first UI for receiving a first input of setting a first screen timeout time related to the display 310 of the electronic device 300 when a first operation is executed in case of no connection made between the electronic device 300 and the external display device 301.

According to certain embodiments, the desktop mode launcher 450 may be executed when the electronic device 300 is connected to the external display device 301. When the electronic device 300 is connected to the external display device 301, the desktop mode launcher 450 may provide an explanation of a desktop mode and also provide an execution of the desktop mode or a mirroring connection option. The desktop mode launcher 450 may provide a UI similar to a desktop UI displayed on the external display device 301. The desktop mode launcher 450 may support resizing of a resizable window. According to an embodiment, the desktop mode launcher 450 may be configured to cause the display 310 to display a first screen and also cause the external display device 301 to display a second screen different from the first screen when a second operation is executed in case of connection made between the electronic device 300 and the external display device 301 via the connector 340. According to an embodiment, the desktop mode launcher 450 may be configured to cause the external display device 301 to display a second UI for receiving a second input of setting a second screen timeout time related to the external display device 301 when the second operation is executed.

According to an embodiment, the desktop mode launcher 450 may include a white list update service 452 and a white list database (DB) 454.

According to an embodiment, the white list update service 452 may obtain a white list which is a list of applications that support resizing, for example, from the server 309 in FIG. 3. After the desktop mode launcher 450 is executed, the white list update service 452 may periodically check, using an alarm service, whether the white list has been updated in the server 309. The white list update service 452 may obtain a URI of a white list file by using an API provided by the server 309 and then download the white list file. When the white list is updated, the server 309 may forward the white list to a policy manager 463 in the framework 460. Then the policy manager 463 may store the white list in a policy DB 464. The white list update service 452 may receive the white list from the policy manager 463 and store the received white list in the white list DB 454. The white list DB 454 may store at least one of a name of an application supporting resizing and/or a name of a related package. For example, the white list database 454 may store at least one of a name of an application supporting resizing and/or a name of a related package among applications installed in the electronic device 300.

According to certain embodiments, the framework 460 may include a desktop mode service 461, a desktop mode policy manager 462, the policy manager 463, a window manager 465, a power manager 466, and an activity manager 467.

According to an embodiment, when any one of the first application 410 to the third application 430 is executed, the desktop mode service 461 may perform a function of fetching an exception of the executed application. The exception may include information on whether the application is executed in a static window or a freeform window, information on whether orientation is supported, and information on whether resizing is supported. The desktop mode service 461 may check, from the white list DB 454 included in the desktop mode launcher 450, whether the application (e.g., 410, 420, or 430) that should be executed exists in the white list DB 454, and also check information on the exception for each application from the desktop mode policy manager 462.

According to an embodiment, the desktop mode policy manager 462 may receive information obtained by the desktop mode service 461. Then, based on the information received through the desktop mode service 461, the desktop mode policy manager 462 may determine a window type for displaying an execution screen of the application. The desktop mode policy manager 462 may forward a determination result to the desktop mode service 461, and then the desktop mode service 761 may provide a service based on the forwarded result.

According to an embodiment, the policy manager 463 may receive an updated white list from the server 309. The policy manager 463 may store the received white list in the policy DB 464. The policy manager 463 may forward the white list to the white list update service 452.

According to an embodiment, the window manager 465 may update or change the configuration 480. The window manager 465 may create a window, based on the changed configuration 480. For example, when the configuration 480 is changed, the window manager 465 may generate a configuration change event and create a window on the basis of the changed configuration 480. When at least one application of the first application 410 to the third application 430 is executed in the external display device 301, the window manager 465 may include the at least one application on the created window. The window manager 465 may display icons to provide functions such as back, minimize, maximize and/or close in the top header of the window. The window is not limited in number and may include a plurality of applications. According to an embodiment, the window manager 465 may differently set the first screen timeout time related to the display 310 of the electronic device 300 and the second screen timeout time related to the external display device 301. The first and second screen timeout times which are differently set may be forwarded to the power manager 466.

According to an embodiment, the power manager 466 may manage the first screen timeout time and the second screen timeout time. According to an embodiment, based on the first screen timeout time and the second screen timeout time, the power manager 466 may manage, for example, the volume, temperature or power of a battery (e.g., the battery 189 in FIG. 1) of the electronic device 300. The power manager 466 may interwork with a basic input/output system (BIOS, not shown) of the electronic device 300.

According to an embodiment, when the configuration 480 is changed, the activity manager 467 may obtain the changed configuration 480 from the window manager 465. The activity manager 467 may cause a resource manager (not shown) to update the resources 470 based on the changed configuration 480. The activity manager 467 may enable an application or an activity included in the application to configure a screen based on the changed configuration 480. According to an embodiment, the resource manager (not shown) may manage a source code of each of the first application 410 to the third application 430 or a storage space of the memory 350.

According to certain embodiments, the resources 470 may include activity resources 472 contained in the first application 410 to the third application 430. The activity resources 472 may include, for example, information about an image and a layout contained in an execution screen of an activity that is changed based on the configuration 480.

According to certain embodiments, the configuration 480 may include information about a density of a screen generated by the electronic device 300, a direction of a screen (e.g., a horizontal or vertical direction), and a total size of a screen (e.g., width or height). The configuration 480 may correspond to each of the activities included in the first application 410 to the third application 430.

According to certain embodiments, the display information 490 may include information about a physical size (e.g., width and height) of each of the display 310 of the electronic device 300 and the external display device 301.

Figure 6:
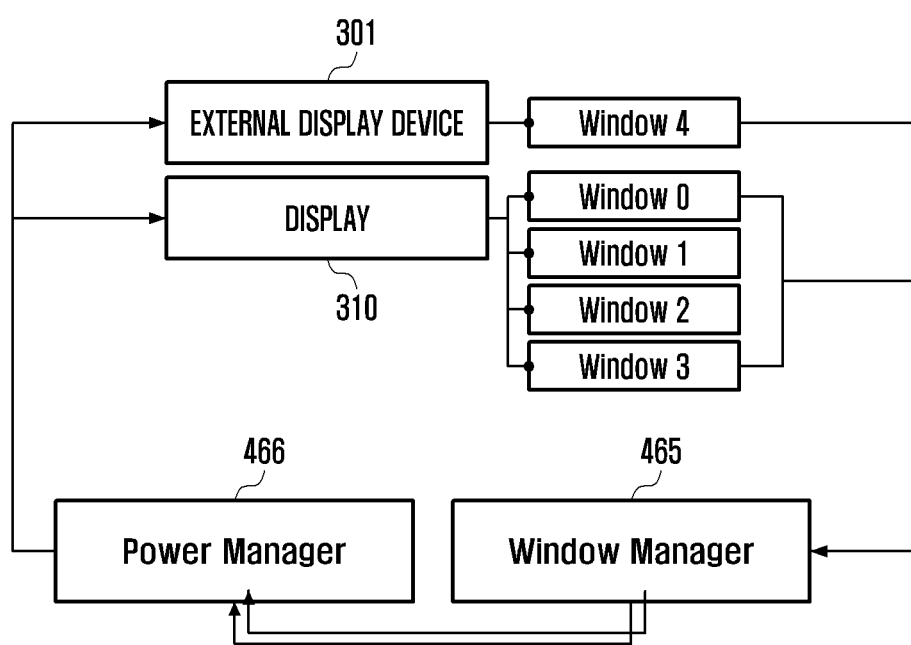
FIG. 6 is a diagram illustrating an example of setting screen timeout times of a display of an electronic device and an external display device according to certain embodiments.

FIG. 6 is a diagram illustrating an example of setting screen timeout times of a display of an electronic device and an external display device according to certain embodiments.

Referring to FIG. 6, the display 310 of the electronic device 300 may include a plurality of windows (e.g. Window 0 to Window 3). The external display device 301 may include one window (e.g., Window 4). According to an embodiment, such windows (e.g., Window 0 to Window 4) are example only and not to be construed as a limitation. The window(s) for the display 310 of the electronic device 300 and the window(s) for the external display device 301 may be determined separately according to the intention of the user of the electronic device 300.

According to certain embodiments, the window manager 465 may differently set the first screen timeout time related to the display 310 of the electronic device 300 and the second screen timeout time related to the external display device 301. Then, the first and second screen timeout times may be forwarded to the power manager 466. The power manager 466 may independently manage the first screen timeout time and the second screen timeout time.

Figure 7:
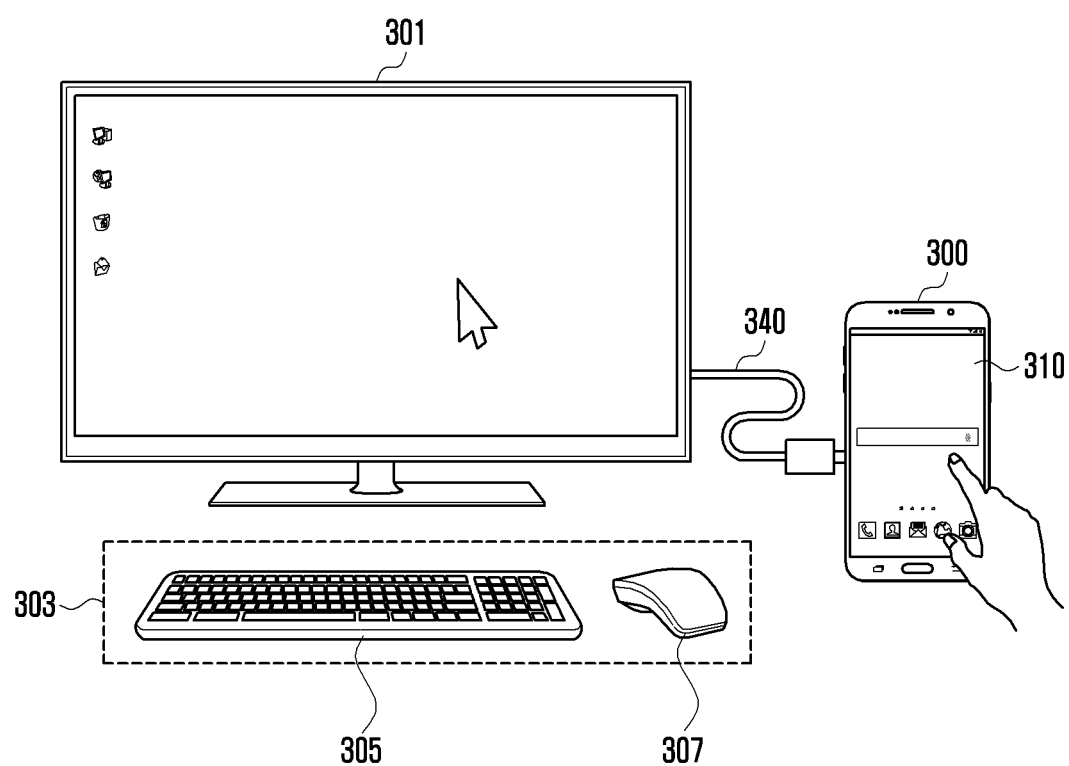
FIG. 7 is a diagram illustrating operations about a connection between an electronic device and an external display device according to certain embodiments.

FIG. 7 is a diagram illustrating operations about a connection between an electronic device and an external display device according to certain embodiments.

Referring to FIG. 7, the electronic device 300 having the display 310 may be connected to the external display device 301 through the connector 340. The external display device 301 may be connected to the external input device 303 in a wired or wireless manner. The external input device 303 may include the keyboard 305 or the mouse 307.

According to an embodiment, when both the display 310 and the external display device 301 are being used, the processor 360 of the electronic device 300 may manage independently the power of the display 310 and the power of the external display device 301. For example, when both the display 310 and the external display device 301 are in use, the processor 360 of the electronic device 300 may turn on or off the display 310. Turning off the display 310 may include pressing the power button 320 of the electronic device 300 or closing the cover equipped in the electronic device 300. When the display 310 is turned off, the processor 360 may be configured to continuously use the external display device 301 through the external input device 303 without entering the electronic device 300 in the sleep mode.

Figure 8:
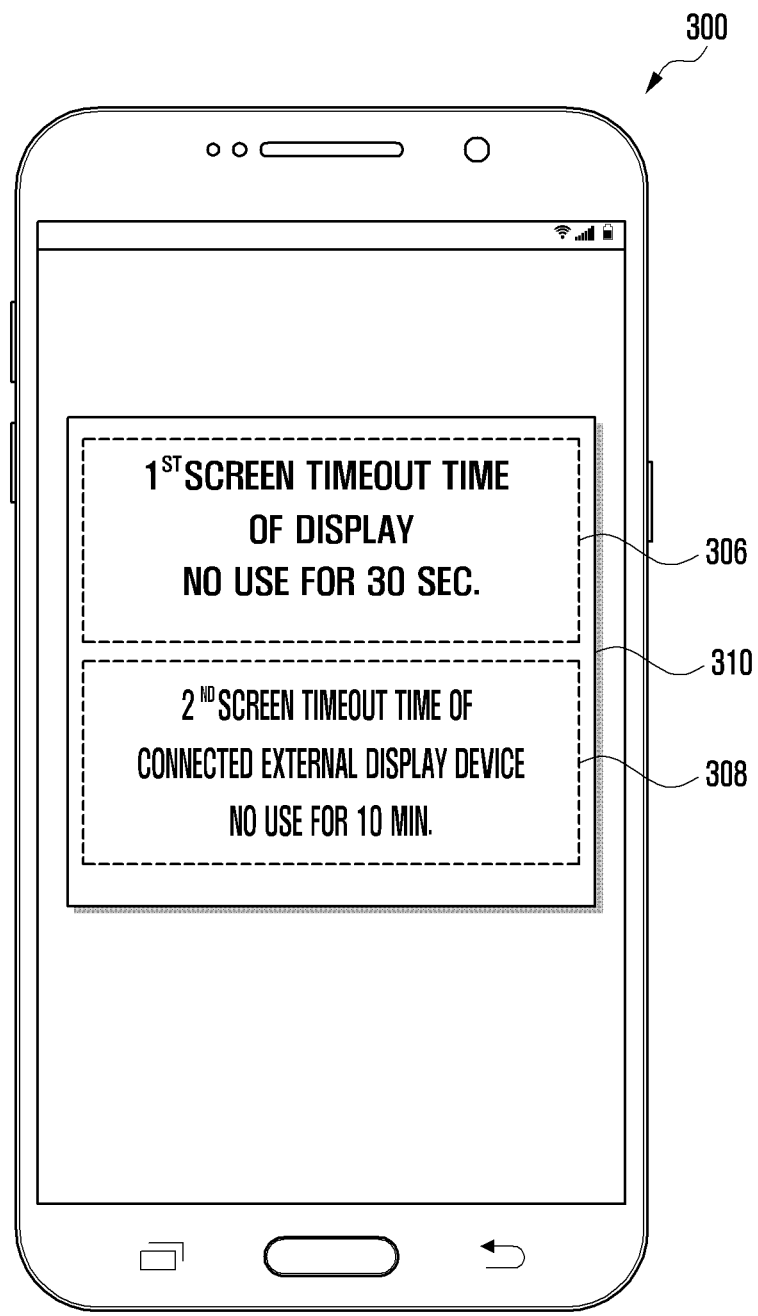
FIG. 8 is a diagram illustrating a user interface for setting a screen timeout time of each of an electronic device and an external display device according to certain embodiments.

FIG. 8 is a diagram illustrating a user interface for setting a screen timeout time of each of an electronic device and an external display device according to certain embodiments.

Referring to FIG. 8, the electronic device 300 according to certain embodiments may set the first screen timeout time of the display 310 and the second screen timeout time of the external display device 301 using a user interface displayed within window, the interface including a settings menu displayed on the display 310.

According to certain embodiments, the first screen timeout time related to the display 310 may be set to, for example, approximately 30 seconds. The first screen timeout time may be set in response to the first input entered in the first UI 306. The second screen timeout time related to the external display device 301 may be set to, for example, approximately 10 minutes. The second screen timeout time may be set in response to the second input entered in the second UI 308.

According to an embodiment, when the electronic device 300 including the display 310 is not connected to the external display device 301, the processor 360 may display the first UI 306 on the display 310. According to an embodiment, when the electronic device 300 including the display 310 is connected to the external display device 301, the processor 360 may display the first UI 306 and the second UI 308 on the display 310. According to an embodiment, when the electronic device 300 including the display 310 is connected to the external display device 301, the processor 360 may display the first UI 306 on the display 310 and also display the second UI 308 on the external display device 301.

Figure 9:
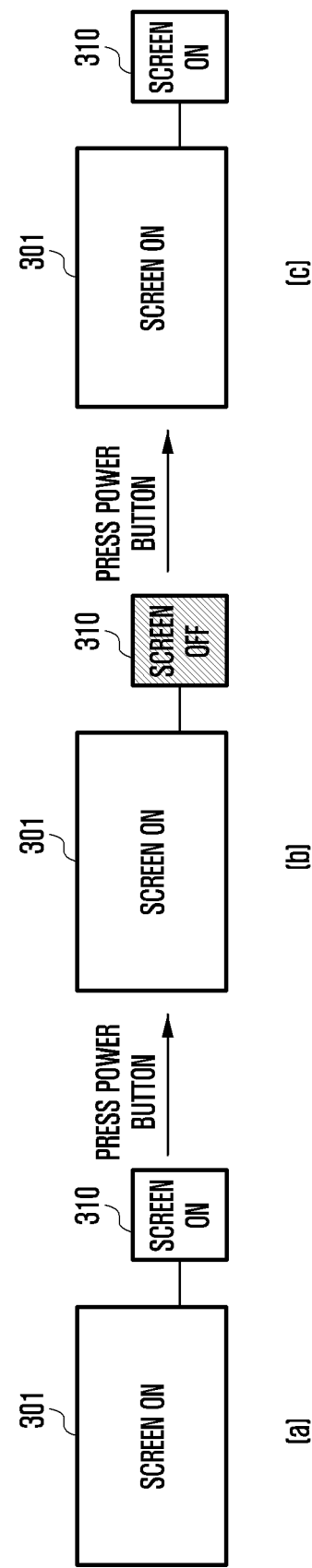
FIG. 9 is a diagram illustrating an example of turning on/off a display of an electronic device and an external display device according to certain embodiments.

FIG. 9 is a diagram illustrating an example of turning on/off a display of an electronic device and an external display device according to certain embodiments.

Referring to (a) of FIG. 9, when the electronic device 300 including the display 310 is connected to the external display device 301, the processor 360 may turn on the screens of both the display 310 and the external display device 301.

Referring to (b) of FIG. 9, when the user of the electronic device 300 presses the power button 320 to turn off the electronic device 300, the processor 360 may turn off the screen of the display 310 and maintain the screen of the external display device 301 in a turned-on state.

Referring to (c) of FIG. 9, when the user of the electronic device 300 presses again the power button 320 to turn on the electronic device 300, the processor 360 may turn on the screen of the display 310 while maintaining the screen of the external display device 301 in a turned-on state.

Figure 10:
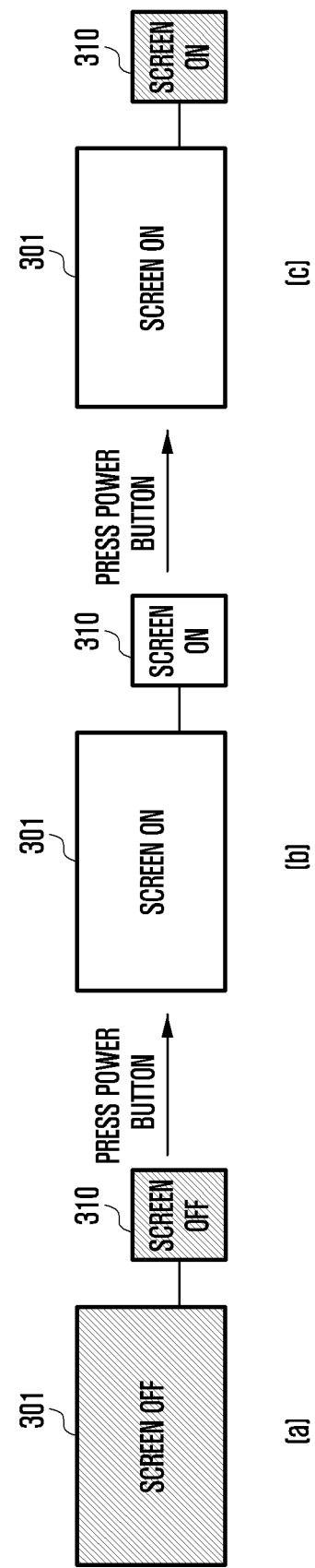
FIG. 10 is a diagram illustrating another example of turning on/off a display of an electronic device and an external display device according to certain embodiments.

FIG. 10 is a diagram illustrating another example of turning on/off a display of an electronic device and an external display device according to certain embodiments.

Referring to (a) of FIG. 10, when the electronic device 300 including the display 310 has been connected to the external display device 301, and then when both the first timeout time of the display 310 and the second timeout time of the external display device 301 elapse, the processor 360 may turn off the screens of both the display 310 and the external display device 301.

Referring to (b) of FIG. 10, when the user of the electronic device 300 presses the power button 320 to turn on the electronic device 300, the processor 360 may turn on the screens of both the display 310 and the external display device 301.

Referring to (c) of FIG. 10, when the user of the electronic device 300 presses again the power button 320 to turn off the electronic device 300, the processor 360 may turn on the screen of the display 310 while maintaining the screen of the external display device 301 in a turned-on state.

Figure 11:
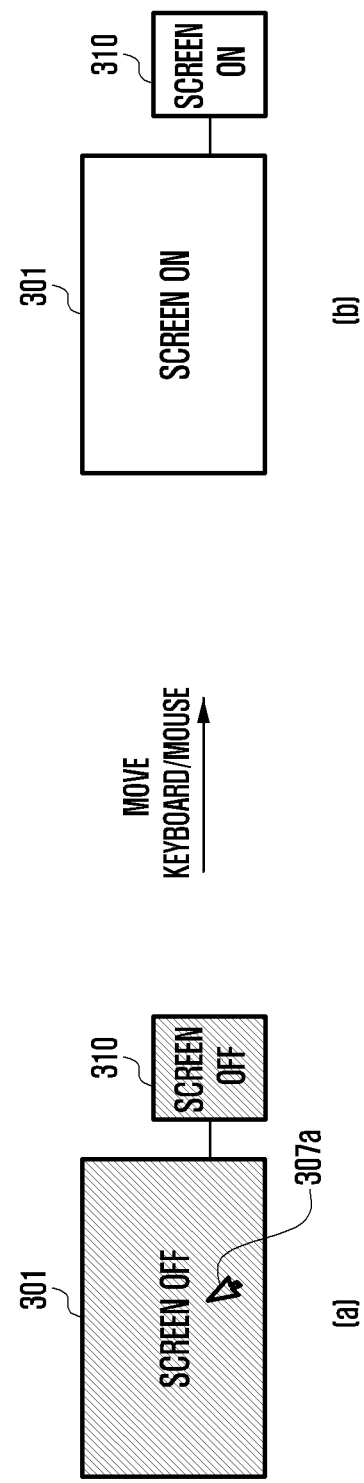
FIG. 11 is a diagram illustrating still another example of turning on/off a display of an electronic device and an external display device according to certain embodiments.

FIG. 11 is a diagram illustrating still another example of turning on/off a display of an electronic device and an external display device according to certain embodiments.

Referring to (a) of FIG. 11, when the electronic device 300 including the display 310 is connected to the external display device 301, and when the first timeout time of the display 310 and the second timeout time of the external display device 301 elapses, the processor 360 may turn off the screens of both the display 310 and the external display device 301. In this case, an input of the external input device 303 including any of the keyboard 305 (e.g., selection of a key) and the mouse 307 (e.g., movement a pointer 307a of the mouse 307) may be detected. According to an embodiment, the external input device 303 may be connected to the external display device 301 or the electronic device 300 in a wired or wireless manner as described above with reference to FIG. 3.

Referring to (b) of FIG. 11, when the input from the external input device 303 such as a movement of the pointer 307a of the mouse 307 occurs in the external display device 301, the processor 360 may turn on the screens of both the display 310 and the external display device 301.

Figure 12:
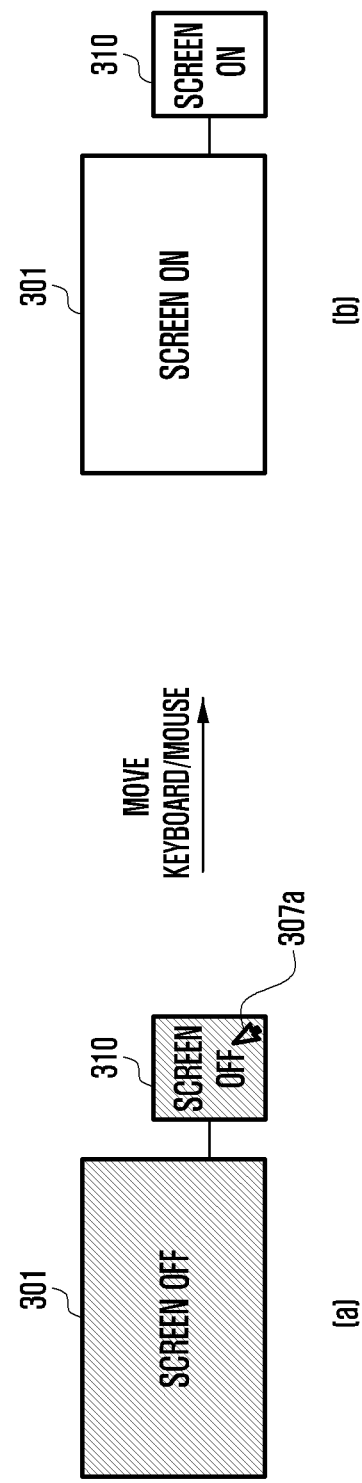
FIG. 12 is a diagram illustrating yet another example of turning on/off a display of an electronic device and an external display device according to certain embodiments.

FIG. 12 is a diagram illustrating yet another example of turning on/off a display of an electronic device and an external display device according to certain embodiments.

Referring to (a) of FIG. 12, when the electronic device 300 including the display 310 is connected to the external display device 301, and when both the first timeout time of the display 310 and the second timeout time of the external display device 301 elapses, the processor 360 may turn off the screens of both the display 310 and the external display device 301. In this case, an input of the external input device 303 including the keyboard 305 (e.g., input of a key) and the mouse 307 (e.g., movement of the pointer 307a using the mouse 307) may be detected. According to an embodiment, the external input device 303 may be connected to the external display device 301 or the electronic device 300 in a wired or wireless manner as described above with reference to FIG. 3.

Referring to (b) of FIG. 12, when the input of the external input device 303, such as a movement of the pointer 307a by the mouse 307, occurs in the display 310, the processor 360 may turn on the screens of both the display 310 and the external display device 301.

Figure 13:
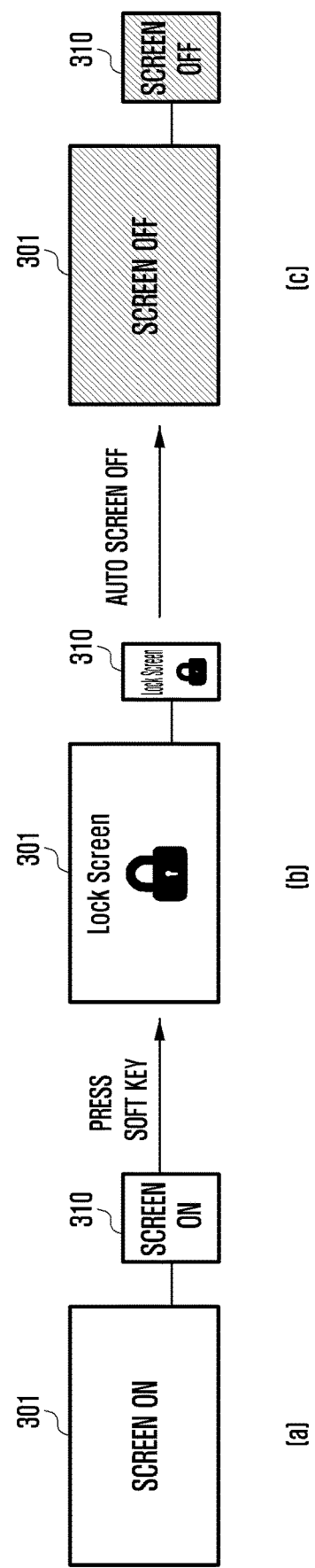
FIG. 13 is a diagram illustrating an example of locking and turning on/off a display of an electronic device and an external display device according to certain embodiments.

FIG. 13 is a diagram illustrating an example of locking and turning on/off a display of an electronic device and an external display device according to certain embodiments.

Referring to (a) of FIG. 13, when the electronic device 300 including the display 310 is connected to the external display device 301, the processor 360 may turn on the screens of both the display 310 and the external display device 301.

Referring to (b) of FIG. 13, when the user of the electronic device 300 presses a predetermined soft key (e.g., such as a selectable icon displayed on the display, rather than a hardware key), the processor 360 may lock the screens of both the display 310 and the external display device 301.

Referring to (c) of FIG. 13, when a predetermined time elapses in a lock state of the screens of both the display 310 and the external display device 301, the processor 360 may turn off the screens of both the display 310 and the external display device 301.

Figure 14:
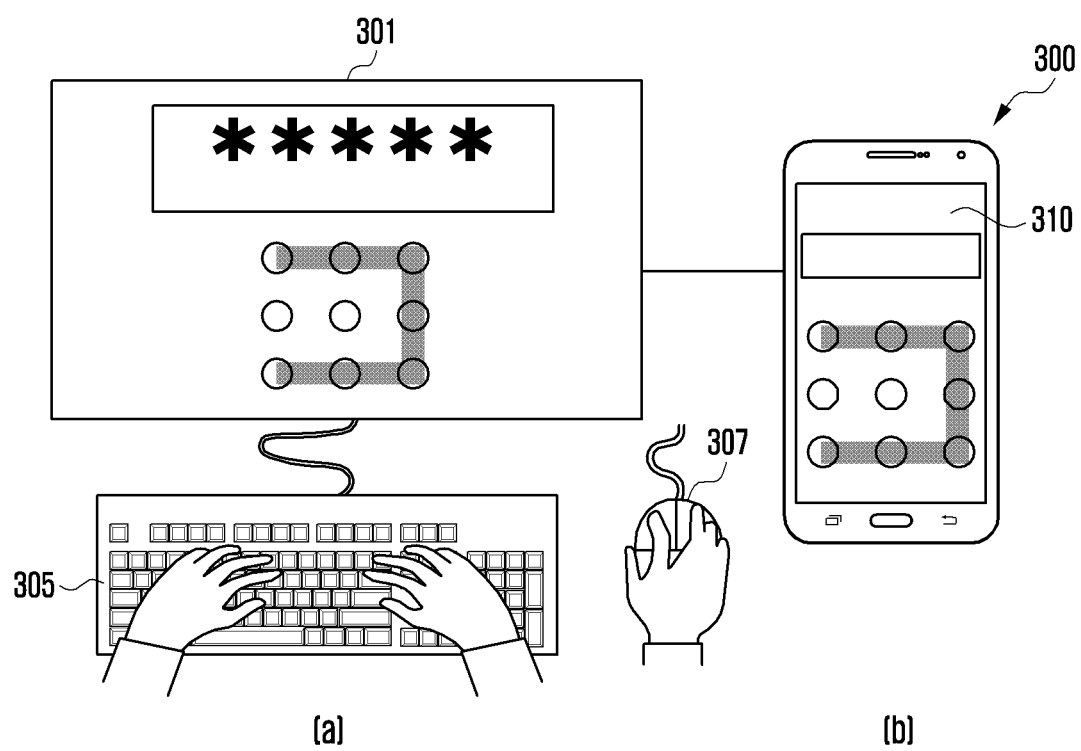
FIG. 14 is a diagram illustrating an example of unlocking a display of an electronic device and an external display device according to certain embodiments.

FIG. 14 is a diagram illustrating an example of unlocking a display of an electronic device and an external display device according to certain embodiments.

Referring to (a) of FIG. 14, unlocking the external display device 301 may be executed by entering a predetermined password or pattern through the keyboard 305 or the mouse 307.

Referring to (b) of FIG. 14, unlocking the display 310 of the electronic device 300 may be executed by entering a predetermined password or pattern through the display 310.

According to an embodiment, the predetermined password or pattern entered through the keyboard 305 or the mouse 307 to unlock the external display device 301 may be the same as or different from the predetermined password or pattern entered through the display 310 to unlock the display 310 of the electronic device 300.

According to certain embodiments, when the electronic device 300 including the display 310 is connected to the external display device 301, each of the display 310 and the external display device 301 may be set in a state of a lock screen. In this case, as shown in (a) and (b) of FIG. 4, unlocking the lock screen may be performed at each of the external display device 301 or the display 310.

Figure 15:
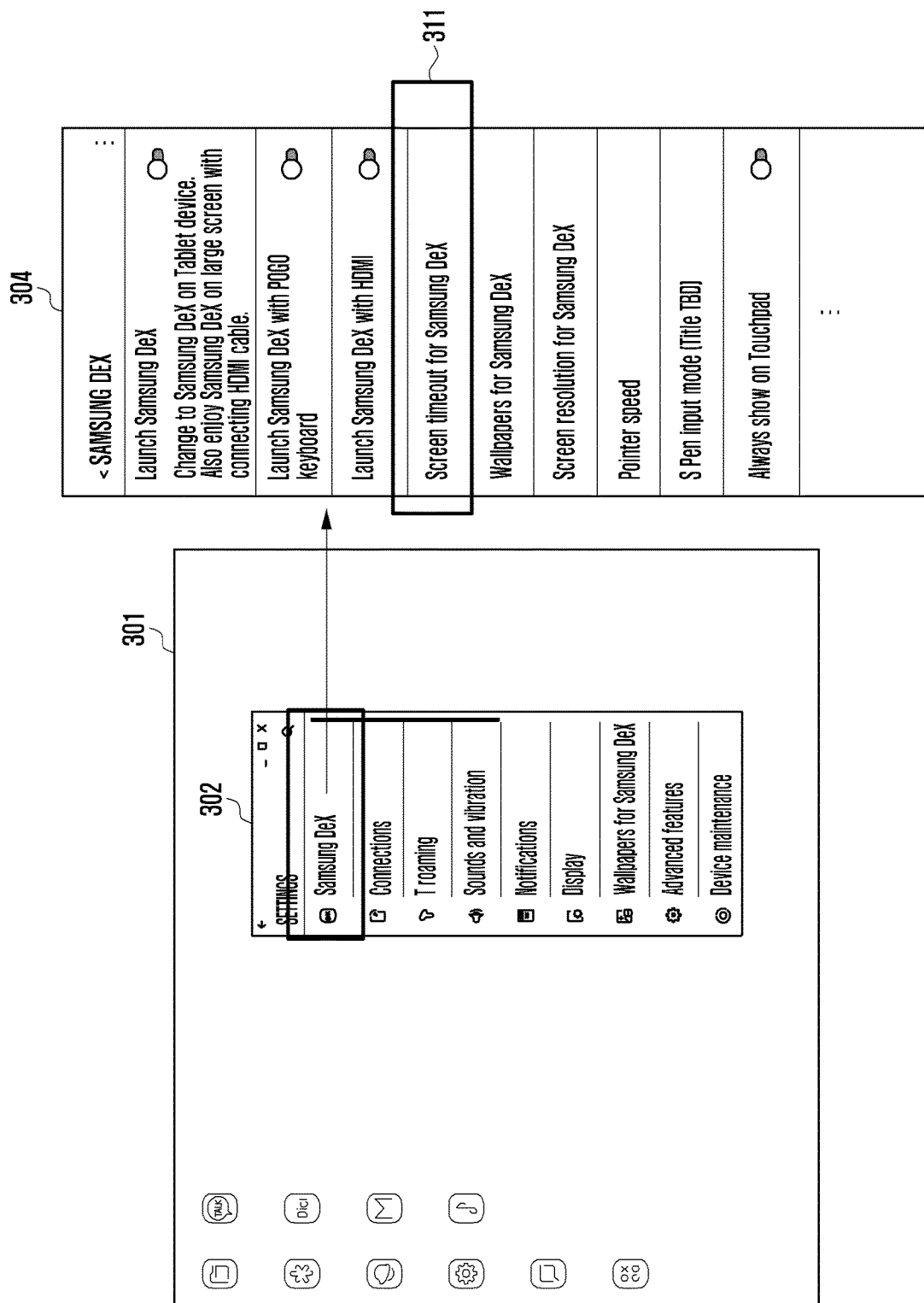
FIG. 15 is a diagram illustrating an example of setting a screen timeout at an external display device according to certain embodiments.

FIG. 15 is a diagram illustrating an example of setting a screen timeout at an external display device according to certain embodiments.

Referring to FIG. 15, the external display device 301 may display a SETTINGS menu 302 in response to a user's input (e.g., a second input) using the external input device 303.

According to an embodiment, when the user selects the SETTINGS menu 302, a detailed window 304 including a second screen timeout setting menu 311 may be displayed, which facilitates configuring the second screen timeout related to the external display device 301. Although FIG. 15 shows that the SETTINGS menu 302 and the detailed window 304 are executed at the external display device 301, they may be equally executed at the display 310 of the electronic device 300.

Figure 16:
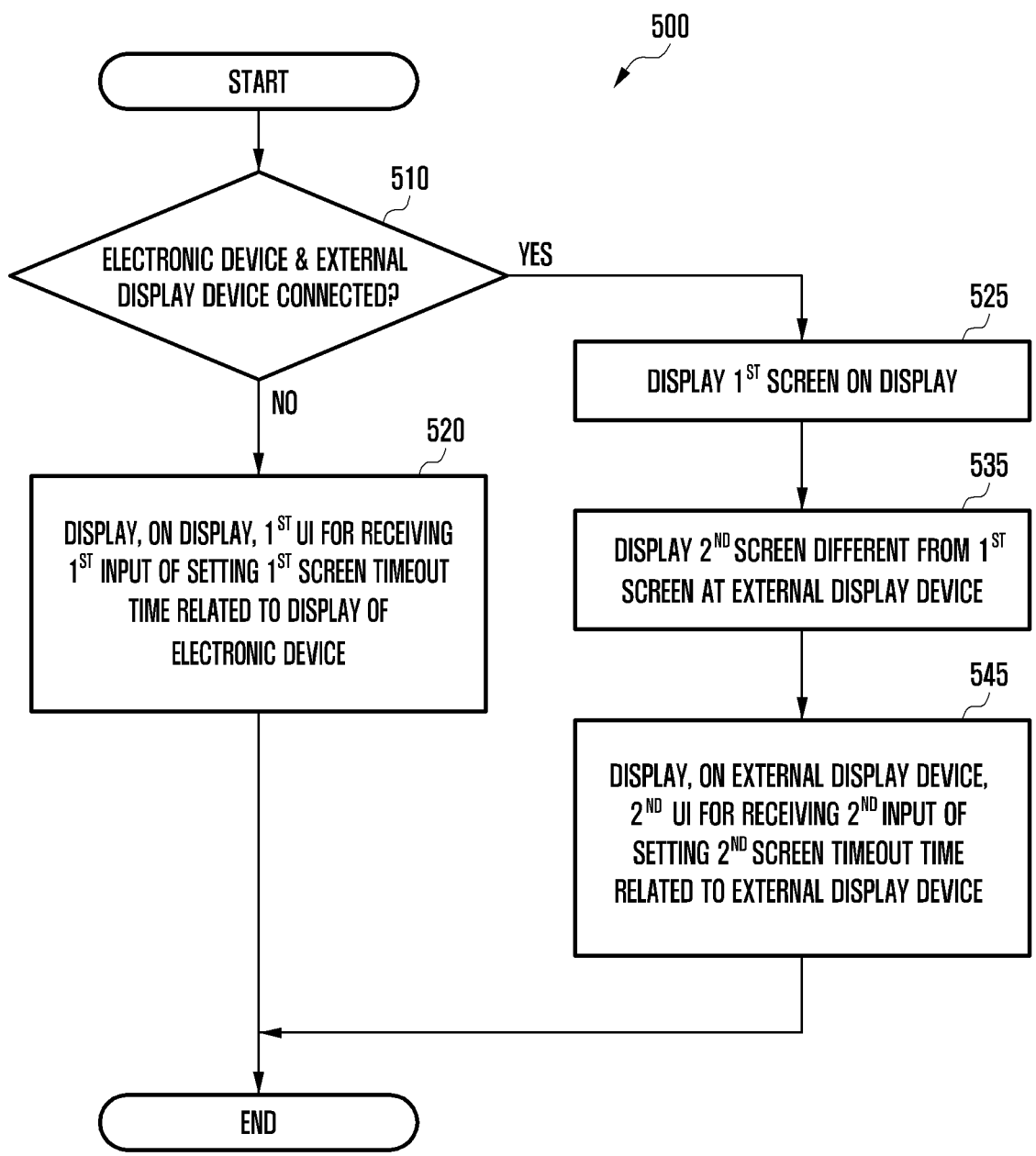
FIG. 16 is a flow diagram illustrating a method for setting a screen timeout at a display of an electronic device and an external display device according to certain embodiments.

FIG. 16 is a flow diagram 500 illustrating a method for setting a screen timeout at a display of an electronic device and an external display device according to certain embodiments.

At operation 510, the processor 360 may determine whether the electronic device 300 and the external display device 301 are operatively coupled (or connected) to each other.

When the electronic device 300 and the external display device 301 are not connected, the processor 360 may display the first UI 306 for receiving the first input of setting the first screen timeout time related to the display 310 of the electronic device 300 on the display 310 at operation 520.

When the electronic device 300 and the external display device 301 are connected, the processor 360 may display a first screen on the display 310 at operation 525.

At operation 535, the processor 360 may display, on the external display device 301, a second screen that is different from the first screen.

At operation 545, the processor 360 may display, on the external display device 301, a second UI 308 for receiving a second input configuring the second screen timeout time related to the external display device 301.

Figure 17:
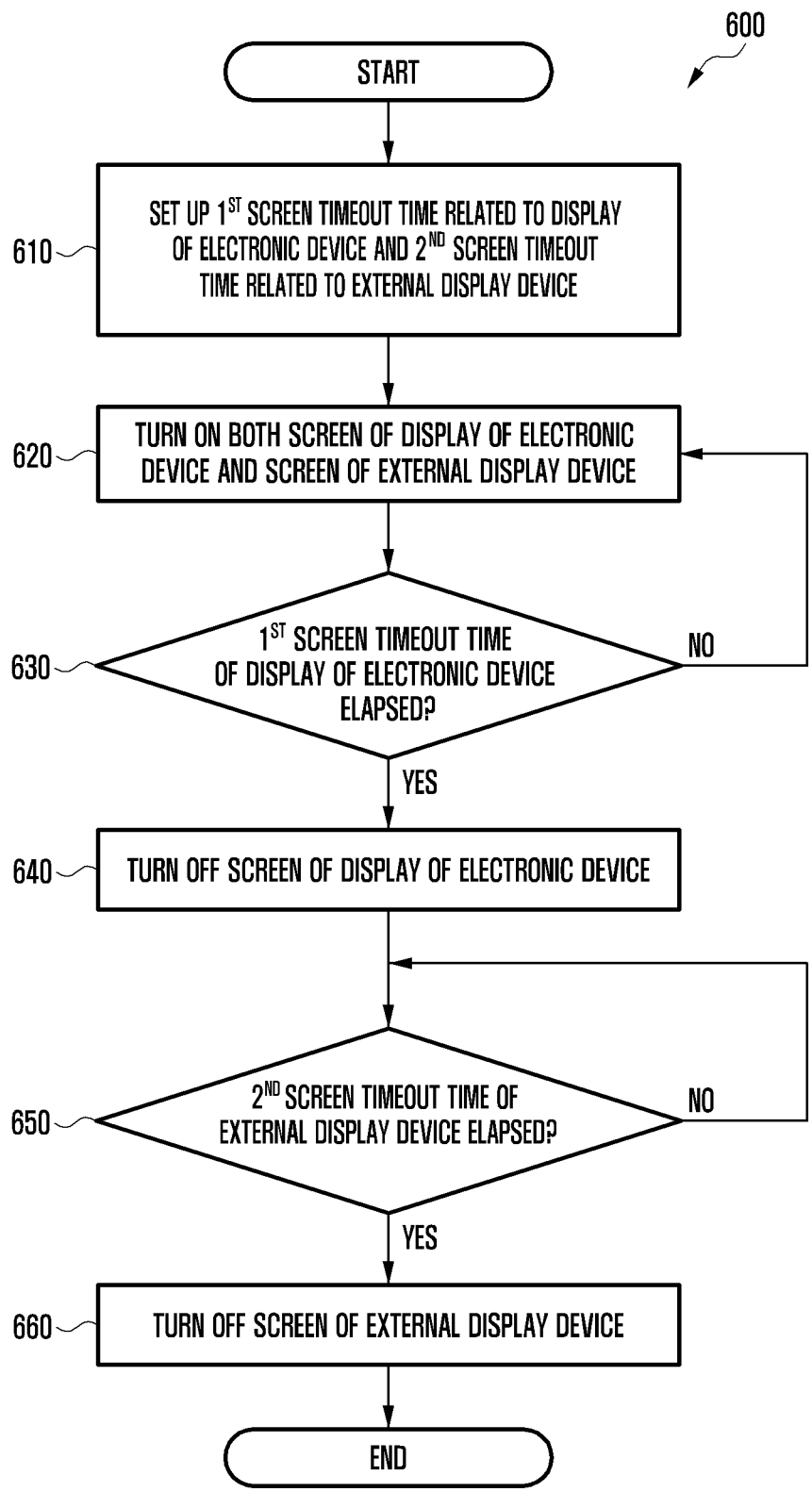
FIG. 17 is a flow diagram illustrating a method for independently controlling power of a display of an electronic device and an external display device according to certain embodiments.

FIG. 17 is a flow diagram 600 illustrating a method for independently controlling power of a display of an electronic device and an external display device according to certain embodiments.

At operation 610, the processor 360 may set up both the first screen timeout time related to the (local) display 310 of the electronic device 300, and the second timeout time related to the external display device 301 in response to a user input.

According to certain embodiments, the second screen timeout time may be longer than the first screen timeout time. For example, the first screen timeout time may be set to approximately 30 seconds to 50 seconds, and the second screen timeout time may be set to approximately 10 minutes to 15 minutes. The processor 360 may update the first screen timeout time and the second screen timeout time according to the final user input time and the occurrence of a predetermined event.

At operation 620, the processor 360 may turn on the screen of the display 310 of the electronic device 300, and the screen of the external display device 301.

At operation 630, the processor 360 may determine whether the first screen timeout time of the display 310 of the electronic device 300 has elapsed.

According to certain embodiments, when a predetermined time has elapsed from the last time of user input to the display 310 of the electronic device 300, or when a user input occurs at the external display device 301 for a predetermined time, the processor 360 may determine that the first screen timeout time has elapsed.

When the first screen timeout time has elapsed, the processor 360 may turn off the screen of the display 310 of the electronic device 300 at operation 640.

According to certain embodiments, when the first screen timeout time has not elapsed, the processor 360 may maintain both the screen of the display 310 of the electronic device 300 and the screen of the external display device 301 in a turned-on state.

At operation 650, the processor 360 may determine whether the second screen timeout time of the external display device 301 has elapsed.

When the second screen timeout time of the external display device 301 has elapsed, the processor 360 may turn off the screen of the external display device 301 at operation 660.

According to certain embodiments, when the second screen timeout time has not elapsed, the processor 360 may maintain the screen of the display 310 of the electronic device 300 in a turned-off state and also maintain the screen of the external display device 301 in a turned-on state.

According to certain embodiments, when the first screen timeout time has elapsed and also when the second screen timeout time has elapsed, the processor 360 may turn off both the screen of the display 310 of the electronic device 300 and the screen of the external display device 301 and also operate the electronic device 300 in a sleep mode.

Therefore, according to the certain embodiments, battery power consumption of the electronic device 300 can be reduced by independently controlling the power of the display 310 of the electronic device 300 and the power of the external display device 301.

While the disclosure has been particularly shown and described with reference to example embodiments thereof, it will be understood by those skilled in the art that certain changes in form and details may be made therein without departing from the scope of the subject matter as defined by the appended claims.

What is claimed is:

1. A portable communication device comprising:
   a touchscreen display;
   a communication circuit configured to establish a communication connection with an external display device;
   memory to store a first screen-timeout period of time and a second screen-timeout period of time longer than the first screen-timeout period of time; and
   a processor operatively coupled with the communication circuit, the processor configured to:
      based at least in part on a determination that the communication connection is established between the portable communication device and the external display device using the communication circuit, display a first graphical user interface (GUI) via the touchscreen display, and provide a second GUI to the external display device using the communication circuit such that the second GUI is displayed via the external display device while the first GUI is displayed via the touchscreen display;
      deactivate the touchscreen display based at least in part on an elapse of the first screen-timeout period of time, while the second GUI is provided to and displayed via the external display device; and
      after the touchscreen display is deactivated, deactivate the external display device based at least in part on an elapse of the second screen-timeout period of time.

2. The portable communication device of claim 1, wherein the processor is configured to:
   generate the first GUI and the second GUI based at least in part on the determination that the communication connection is established.

3. The portable communication device of claim 1, wherein the processor is configured to:
   after the touchscreen display is deactivated and before the external display device is deactivated, provide a third GUI different from the first GUI and the second GUI to the external display device using the communication circuit such that the third GUI is displayed via the external display device while the touchscreen display is deactivated.

4. The portable communication device of claim 3, wherein the processor is configured to:
provide a lock screen as the third GUI such that the lock screen is displayed via the external display device.

5. The portable communication device of claim 4, wherein the processor is configured to:
perform the deactivating of the external display device further based on a determination that no user input is received with respect to the touchscreen display for a specified period of time while the lock screen is displayed via the external display device.

6. The portable communication device of claim 1, wherein the processor is configured to:
display a setting screen via the touchscreen display before the touchscreen display is deactivated; and
set the first screen-timeout period of time based at least in part on a user input with respect to the setting screen.

7. The portable communication device of claim 1, wherein the processor is configured to:
transition into an active state before the first GUI is displayed via the touchscreen display;
remain in the active state while the touchscreen display is deactivated based at least in part on the elapse of the first screen-timeout period of time; and
transition from the active state to a sleep state after the external display device is deactivated.

8. The portable communication device of claim 1, wherein the processor is configured to:
after the external display device is deactivated based at least in part on the elapse of the second screen-timeout period of time, refrain from providing the second GUI to the external display device.

9. A method in a portable communication device comprising:
based at least in part on a determination that the communication connection is established between the portable communication device and the external display device using the communication circuit, displaying a first graphical user interface (GUI) via the touchscreen display, and providing a second GUI to the external display device using the communication circuit such that the second GUI is displayed via the external display device while the first GUI is displayed via the touchscreen display;
deactivating the touchscreen display based at least in part on an elapse of the first screen-timeout period of time, while the second GUI is provided to and displayed via the external display device; and
after the touchscreen display is deactivated, deactivating the external display device based at least in part on an elapse of the second screen-timeout period of time.

10. The method of claim 9, further comprising:
generating the first GUI and the second GUI based at least in part on the determination that the communication connection is established.

11. The method of claim 9, further comprising:
after the touchscreen display is deactivated and before the external display device is deactivated, providing a third GUI different from the first GUI and the second GUI to the external display device using the communication circuit such that the third GUI is displayed via the external display device while the touchscreen display is deactivated.

12. The method of claim 11, further comprising:
providing a lock screen as the third GUI such that the lock screen is displayed via the external display device.

13. The method of claim 12, further comprising:
performing the deactivating of the external display device further based on a determination that no user input is received with respect to the touchscreen display for a specified period of time while the lock screen is displayed via the external display device.

14. The method of claim 9, further comprising:
displaying a setting screen via the touchscreen display before the touchscreen display is deactivated; and
setting the first screen-timeout period of time based at least in part on a user input with respect to the setting screen.

15. The method of claim 9, further comprising:
transiting into an active state before the first GUI is displayed via the touchscreen display;
remaining in the active state while the touchscreen display is deactivated based at least in part on the elapse of the first screen-timeout period of time; and
transiting from the active state to a sleep state after the external display device is deactivated.

16. The method of claim 9, further comprising:
after the external display device is deactivated based at least in part on the elapse of the second screen-timeout period of time, refraining from providing the second GUI to the external display device.

* * * * *